United States Patent

Marin

[11] Patent Number: 6,125,736
[45] Date of Patent: *Oct. 3, 2000

[54] FERMENTER

[75] Inventor: Francesco Marin, Spilimbergo, Italy

[73] Assignee: Castle Commercial Enterprises Limited, Dublin, Ireland

[ * ] Notice: This patent issued on a continued prosecution application filed under 37 CFR 1.53(d), and is subject to the twenty year patent term provisions of 35 U.S.C. 154(a)(2).

[21] Appl. No.: 09/180,584
[22] PCT Filed: Nov. 17, 1997
[86] PCT No.: PCT/IT97/00281
§ 371 Date: Nov. 12, 1998
§ 102(e) Date: Nov. 12, 1998
[87] PCT Pub. No.: WO98/45403
PCT Pub. Date: Oct. 15, 1998

[30] Foreign Application Priority Data

Apr. 4, 1997 [IT] Italy ................. UD97A0061

[51] Int. Cl.⁷ .................................. C12C 11/00
[52] U.S. Cl. ................. 99/276; 99/277; 435/813
[58] Field of Search .................. 99/276, 277, 277.1, 99/278; 435/300.1, 813; 220/225

[56] References Cited

U.S. PATENT DOCUMENTS

| | | | |
|---|---|---|---|
| 3,478,669 | 11/1969 | Lanes | 99/276 |
| 4,413,747 | 11/1983 | Tenold et al. | 220/225 |
| 4,790,238 | 12/1988 | Hsu | 99/276 |
| 4,836,918 | 6/1989 | Szikriszt | |

FOREIGN PATENT DOCUMENTS

| | | |
|---|---|---|
| 0 061 228 | 9/1982 | European Pat. Off. . |
| 1495919 | 12/1967 | France . |
| 237 301 | 7/1986 | Germany . |

Primary Examiner—Reginald L. Alexander
Attorney, Agent, or Firm—Browdy and Neimark

[57] ABSTRACT

The present invention relates to a fermenter consisting of a vat provided internally with a diaphragm designed to retain the gas bubbles produced by fermentation and release them when they have reached a large size. The diaphragm consists of a concave surface underneath which the rising bubbles are temporarily collected and continue to rise as soon as they flow out from the diaphragm full of gas. In this way the small bubbles which rise up combine together to form others which are larger and able to create strong currents which continuously remix the floating marc and in this way make it possible to avoid or, at least greatly limit, solidification of the cap, keeping it constantly fluid.

23 Claims, 3 Drawing Sheets

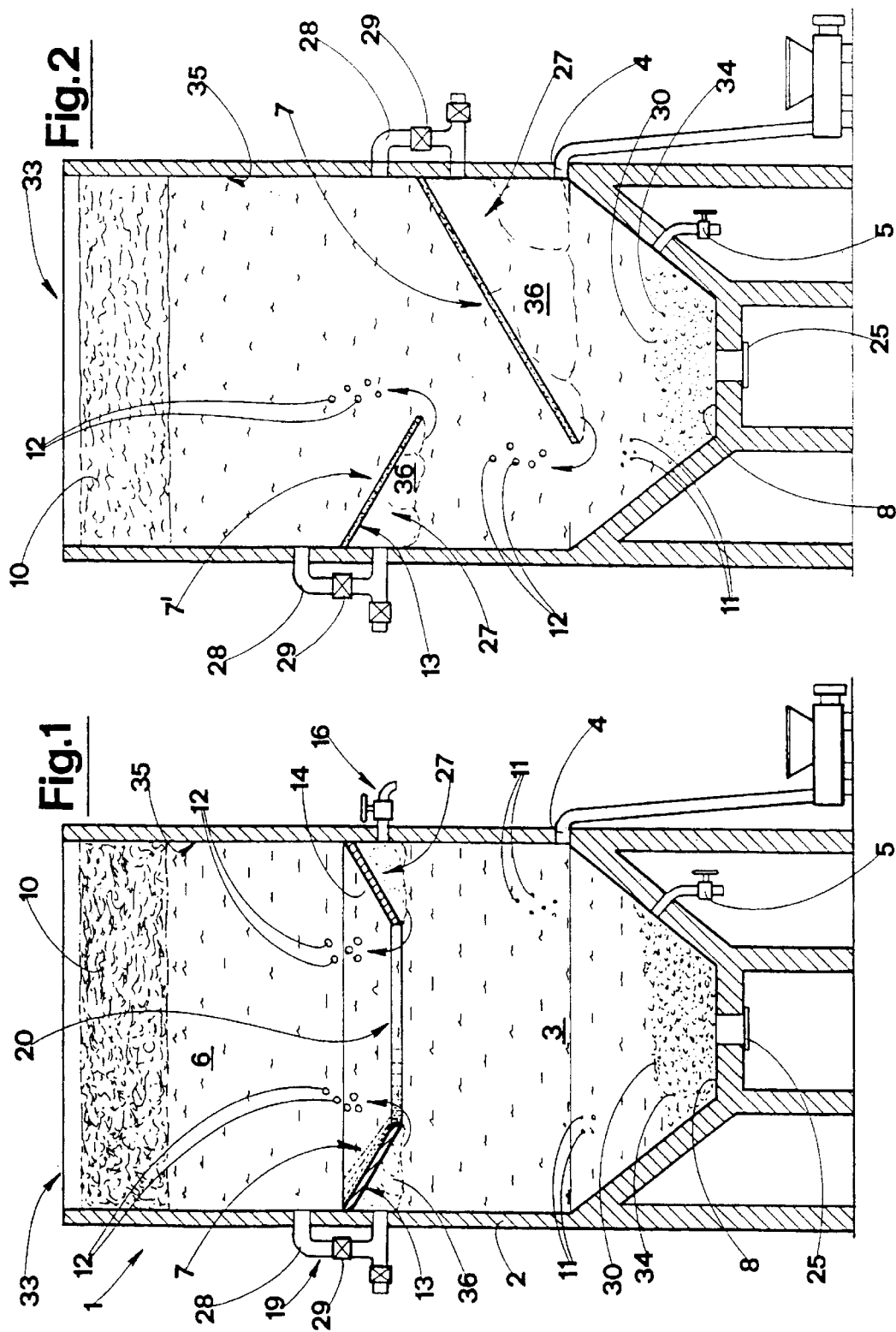

FERMENTER

FIELD OF THE INVENTION

The present invention relates to a fermenter used in particular in the wine industry for the vinification of musts.

DESCRIPTION OF THE RELATED ART

In the technical sector very many types of fermenters are known, said fermenters all comprising essentially at least one container, or vat, with an overturned frustoconical bottom having an opening for the introduction of liquid to be fermented and a tap for discharging the fermented liquid.

The liquid to be fermented, in the case of vinification, i.e. the production of wine from pressed grapes, is composed of both the grape juice and the marc, namely all the solid parts of the grape consisting of skins, grape-pips (seeds present in the grape berries) and, in some cases, the stalks. The fermented liquid is more properly called fermented must or wine.

During the fermentation process, a solid floating layer— the so-called cap—is formed at the top of the vat, said cap consisting of various layers of marc, the outermost one of which usually emerges slightly above the liquid. It therefore consists of a particularly compact mass which must be broken up to avoid excessive solidity at the end of fermentation, but also in order to exploit its characteristics during the course of soaking in the fermenting liquid.

The skins, for example, contain the substances which colour the wine, and this characteristic is of particular importance in the case of grapes which release the extracted colouring substances less easily, such as the Sangiovese grape variety. In order to make proper use of the cap, it is important, therefore, that it should not be left simply to float on top of the liquid to be fermented, but, on the contrary, that it should be exploited in order to improve the quality of the wine. For this purpose, there exist known fermentation containers which, during the course of alcoholic fermentation, allows one to perform complete and calibrated movement of the marc so as to improve the release of colouring and polyphenol substances. More particularly, these containers are equipped with a mechanical device having three motor-driven rotating shafts provided with vanes arranged in the manner of an open screw and a repassing pump designed to re-introduce the marc into the bottom part of the fermenter.

This solution, however, is extremely complex and costly. Morover, the mechanical action on the cap generates an undesired quantity of dregs which is deposited, subsequently, on the bottom of the vat.

It is known, moreover, of fermenters provided with continuous rake-type conveyors or screws arranged at the top of the fermenter and designed to remove mechanically part of the cap which has surfaced and re-introduce it into the bottom part of the vinification device or convey it away definitively.

Finally, it is known to act on the cap using pneumatic pistons so as to immerse it in the wine-must, even only partially, in order to break it up and reduce the solidity thereof. This operation, which is known as "plunging", is repeated two or three times a day and requires particular attention since each plunging operation causes splits in the marc, increasing the formation of dregs.

Plunging may also be performed by means of the introduction of compressed air alone using guns or the like, in order to move and remix the cap.

When this operation is performed manually, the personnel must be instructed beforehand how to carry out the operation at the predetermined speed.

The introduction of an excessive amount of air may result in substantial losses of alcohol or, in some cases, favour acetic fermentation which transforms the wine into vinegar. On the other hand, the introduction of too little air needlessly slows down the fermentation process. Considering that a vat may contain up to 3000–4000 hl, the importance and delicate nature of these operations may be easily understood. Any error in evaluation during the plunging operations may result in the loss of a considerable quantity of wine.

All the solutions of the known type illustrated above have in common the fact that they act mechanically on the cap, and what is more after the latter has already formed and reached a certain solidity. Moreover the mechanical action on the cap promotes disintegration of the marc causing the quantity of dregs produced to increase in an undesirable manner. As is known, these dregs may give rise to undesirable tastes and require further operations for subsequent cleaning of the wine.

There exists a further solution which, in the case of large vats which would make the said plunging operations difficult, performs repassing carried out using various devices, the ultimate aim of which is to convey onto the cap, in the form of a spray, the must contained in the vat.

This solution, although it is simple to implement and widely used, does not allow thorough remixing of all the marc since preferential paths along which the wine-must flows down inside the cap are formed.

This solution also requires, for application thereof, the presence of pumps and pipes which make it costly and subject to stoppages due to any faults or malfunctions. The object of the present invention is therefore to overcome the said drawbacks of the devices of the known type by providing a fermenter, which does not require motor-driven mechanical devices for moving the marc. A further object is that of improving the exploitation of the marc, by reducing at the same time the number of operations otherwise required for this.

OBJECTS AND SUMMARY OF THE INVENTION

Moreover, one object of the present invention is to reduce the number of mechanical devices present in the fermenters in order to reduce the manufacturing and running costs. In this way it is possible, moreover, to reduce also the number of faults which may arise during the fermentation stages.

Finally, a further object is to simplify the use of the fermenter.

These and still further objects are all achieved by a fermenter as described in the claims which follow.

More particularly the fermenter in question is provided with a diaphragm designed to retain the gas bubbles produced by fermentation and release them when these have reached a larger size. The diaphragm consists of a concave surface underneath which the rising bubbles are temporarily accumulated. The said bubbles then continue to rise as soon as they flow out from the diaphragm full of gas. In this way the small bubbles which rise up combine together to form other larger bubbles which are able to create strong currents which continuously remix the floating marc and in this way are able prevent, or at least greatly limit, solidification of the cap. Thus, mechanical devices designed to act on the cap are no longer necessary since the latter is no longer formed or, even if it does form, it does not solidify.

Once fermentation has ended, the marc may be removed from the vat by simply acting on the bottom hatch intended also for removal of the dregs, or, more simply, it may be allowed to flow out through a pipe located in the vicinity of the diaphragm.

BRIEF DESCRIPTION OF THE DRAWING FIGURES

Further characteristic features and advantages of the present invention will emerge more clearly from the detailed description which follows of a preferred embodiment, illustrated purely by way of a non-limiting example, in the accompanying drawings in which:

FIG. 1 shows a schematic view of a fermenter according to the present invention;

FIG. 2 shows a constructional variant of the diaphragm according to FIG. 1;

DETAILED DESCRIPTION OF THE PREFERRED EMBODIMENTS

Figure 5:
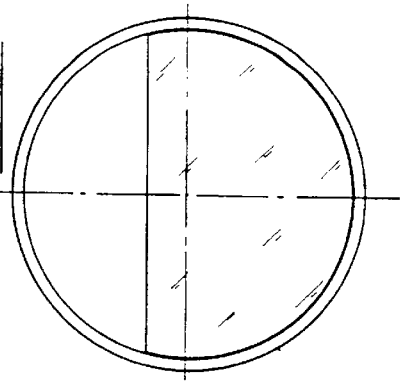
FIGS. 5 and 6 show a simplified plan view of two different emebodiments of the diaphragms according to FIG. 2.

With particular reference to the accompanying FIG. 1, 1 denotes a fermenter in its entirety.

The fermenter 1 comprises in particular a vat 2 with a bottom 8, containing a solution to be fermented 3 consisting in the example illustrated here of the wine, must, marc and any chemical additives, yeasts or the like. The vat 2 has, moreover, an opening 4 for the introduction of the solution to be fermented 3, namely the pressed grape, and an opening 5 for removal of a fermented solution 6, namely the wine. Obviously the introduction of the pressed grape may also be performed by supplying it directly through a top opening 33 of the vat 2.

The vat 2 has preferably an overturned frustoconical bottom for facilitating the extraction, at the end of fermentation, of the solid residue, namely dregs, marc 10 and grape-pips 34. In the region of this bottom 8 there is arranged a discharge hatch 25 by means of which it is possible to access the bottom 8 not only for removal of the dregs 30 and the marc 10 but also, if necessary, in order to facilitate access inside the vat 2 for the maintenance and cleaning operations.

The vat 2 comprises internally a device for accumulating the fermentation gas or diaphragm 7 which extends from walls 35 towards the inside of the vat 2 and which is firmly fixed to the said internal walls 35 of the vat 2. This diaphragm 7 is shaped so as to form between the walls 35 of the vat 2 and the bottom part of the diaphragm 7 a concave surface which is able to trap small bubbles of gas 11 formed by fermentation.

The surface in question, in the example illustrated in FIG. 1, consists of an overturned frustoconical surface 14, the outer edge 26 of which is firmly fixed to the external surface of the circular vat 2.

Obviously, if one wished to apply the diaphragm to vats with a non-circular, for example square, cross-section, the diaphragm must have a surface suitable for the purpose, namely, for example, a surface in the form of a truncated pyramid.

An aperture 20 which is not occupied by the diaphragm 7 therefore remains open in the central zone of the vat 2. Through this aperture, the small bubbles of gas 11 may rise up without being intercepted by the gas accumulating diaphragm 7.

The small bubbles 11 which rise up along the perimetral area of the vat 2 are intercepted by a chamber 27 which is open towards the bottom and formed by the concave surface provided between the side walls of the vat 2 and the bottom surface of the diaphragm 7. The small bubbles 11, which accumulate in the chamber 27, gradually fill up the free volume until they form one or more large bubbles 36 which, subsequently, release one by one large bubbles 12 generated by the bubble 36 which, after overcoming the free volume of the chamber 27, flows out from its internal edges (or, lower lip, from which large bubbles escape), into the zone of the opening 20.

In this way the small bubbles 11 form, during their rising movement towards the surface, larger-sized bubbles 12 which are capable of moving continuously a cap 10 formed by the marc contained in the vat 2. The cap 10 is therefore continuously ventilated from the bottom (by the carbon dioxide of the bubbles 12) and the bottom part thereof, in contact with the surface of the wine-must 6, is remixed and again immersed in the wine-must 6 favouring the release of substances, including colouring substances, contained in the cap 10. Release affects the entire surface of the cap 10 since the continuous mixing thereof prevents the latter from solidifying.

Since the cap 10 normally does not reach the solidified state, removal thereof, once fermentation has been terminated, may be performed by simply operating the discharge hatch 25, similar to the operation performed for the dregs 30 and the grape-pips 34.

Owing to the action of the large bubbles 12 during their rising movement in the wine-must 6, remixing of the fermenting liquid 3 is also promoted.

In order to influence the fermentation externally it is possible to connect, by means of pipes 28 or the like, the chamber 27 to the part of the vat 2 which is located above the diaphragm 7. These pipes, which are provided with controllable closing systems 29, may be used, not only for rapidly discharging the gas contained inside the chamber 27, but also for supplying other gas from the outside, for example air, in order to promote fermentation. Moreover, since the zone of the cap 10 located above the diaphragm could be only slightly affected by the remixing action due to the large bubbles 12, the possibility of releasing inside these zones part or all the contents of the chamber 27, enables an optimum remixing action to be obtained in these zones as well. By connecting the chamber 27 to the part of the vat 2 which is located above the diaphragm 7, remixing is accentuated owing to the expansion effect of the gas bubbles which dilate since the pressure $P_2$ in the part of the vat which is located above the diaphragm is lower than the pressure $P_1$ present in the chamber 27.

With the aid of the pipes 28 or simple taps 16, it is also possible to connect together two or more fermenters in order to use, for example, the excess gas produced in one of them to supply other fermenters therewith. This operation has the great advantage that it does not introduce air into the vats in order to move the cap; the air, in fact, influences not only the formation of the cap, but also oxidation of the must.

FIG. 2 shows a constructional variant of the diaphragm 7. According to said variant, two diaphragms 7 and 7' are arranged in cascade, in such a way that the larger-sized bubbles 12 produced by the lower diaphragm 7 supply the diaphragm 7' located above it. In this way it is possible to improve the bubble generation effect inside large vats 12.

Figure 6:
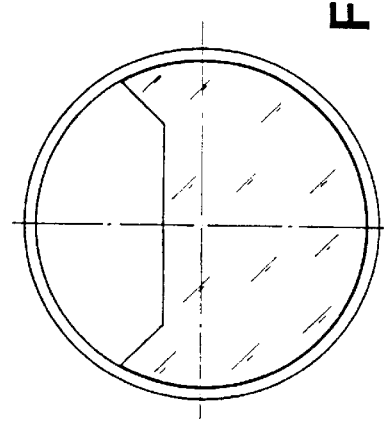
Figure 4:
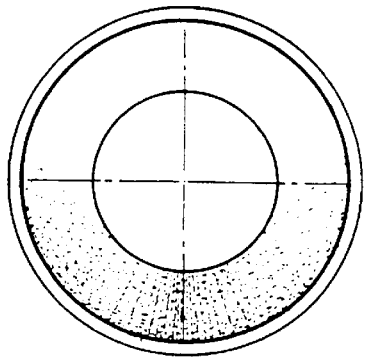
FIG. 4 shows a simplified plan view of the diaphragm according to FIG. 1.

The diaphragms applied to the fermenter according to FIG. 2 are clearly visible in FIGS. 5 and 6. They consist essentially of diaphragms in the form of a semi-circle or a half-moon.

Figure 3:
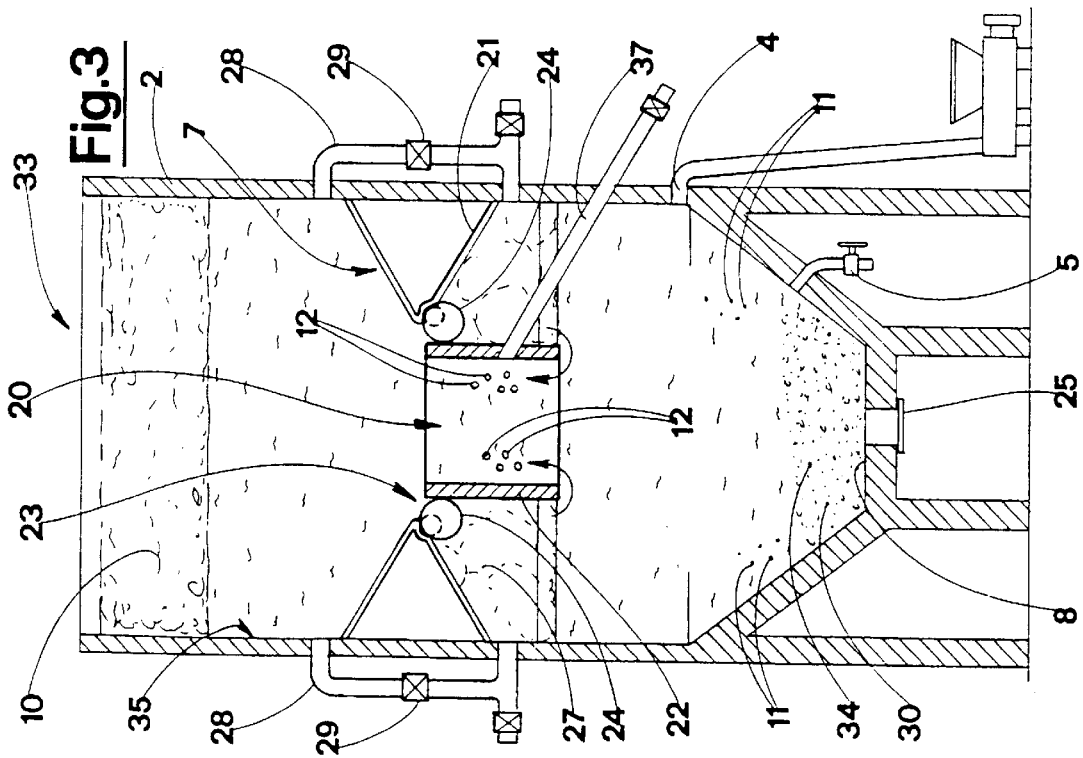
FIG. 3 shows a further variation of the diaphragm according to FIG. 1.

FIG. 3 shows, finally, a further constructional variant of the diaphragm 7. It comprises a frustoconical peripheral zone 21 delimited centrally by a cylindrical zone 22. A controllable annular aperture 23 comprising an inflatable toroid 24 is provided between the two surfaces.

By modifying the inflation pressure of the toroid 24 it is possible to adjust the size of the aperture 23 in an extremely simple and economical manner.

FIG. 3 also shows a discharge means 37 allowing the wine 6 and marc to flow out by means of gravity, once fermentation has ended. This configuration allows extraction of the marc without the aid of pumps, screws and the like in order to transfer the marc to finishing presses (not shown). These auxiliary pumps, in addition to increasing the purchase and running costs, also have the serious drawback of further fragmenting the marc with negative consequences as regards the quality of the wine. In fact, it is well-known that each mechanical operation carried out on the product causes a reduction in the quality of the wine obtained.

The possibility of extracting, therefore, the marc not from the bottom of the vat, as normally occurs, but from an intermediate height sufficient for causing it to flow out directly to the finishing presses, is therefore extremely advantageous both as regards the costs and as regards the quality of the wine which can be obtained. The ideal zone for positioning the inlet end of the discharge means 37 is situated in the region of the opening 20 since, at this height, by continuing the remixing action due to the large rising bubbles 12, the marc, although floating on the wine, is continuously remixed and therefore kept fluid by the rising liquid. Discharging of the marc is therefore ensured and faciliated by the fluidity which it is possible to maintain and which is greatest precisely in the region of the aperture 20.

Alternatively, it is possible to provide an ample-sized discharge opening directly on the side walls of the vat, at the height of the diaphragm, or slightly above it. This solution has the contructional advantage that it does not require the installation of a pipe inside the vat.

In the case of the diaphragms according to FIG. 2, the opening would be advantageously arranged on the side opposite to that to which the diaphragm 7 is fixed, so that the action of the gas contained in the chamber 27 is able to act by pushing the cap in the direction of the discharge opening, therefore further facilitating the extraction operation.

Obviously it is possible to apply also to the aperture 20 of the embodiment according to FIG. 1 a suitable device which is able to vary the size of the aperture 20 as required. This device could, in the example of FIG. 1, be an extension the frustoconical surface in the direction of its imaginary vertex, thus increasing the volume of the gas collected in the chamber 27 or could, more simply, vary exclusively the cross-section of the aperture without increasing the volume of the chamber 27. It would therefore consist, in this second case, of a device which would extend horizontally or upwards, as a result of which, in addition to varying the size of the zone of influence of the large bubbles 12 on the cap 10, it would also be possible to vary generation of the large bubbles 12 so as to be able to influence, during use, the size thereof.

Figure 7:
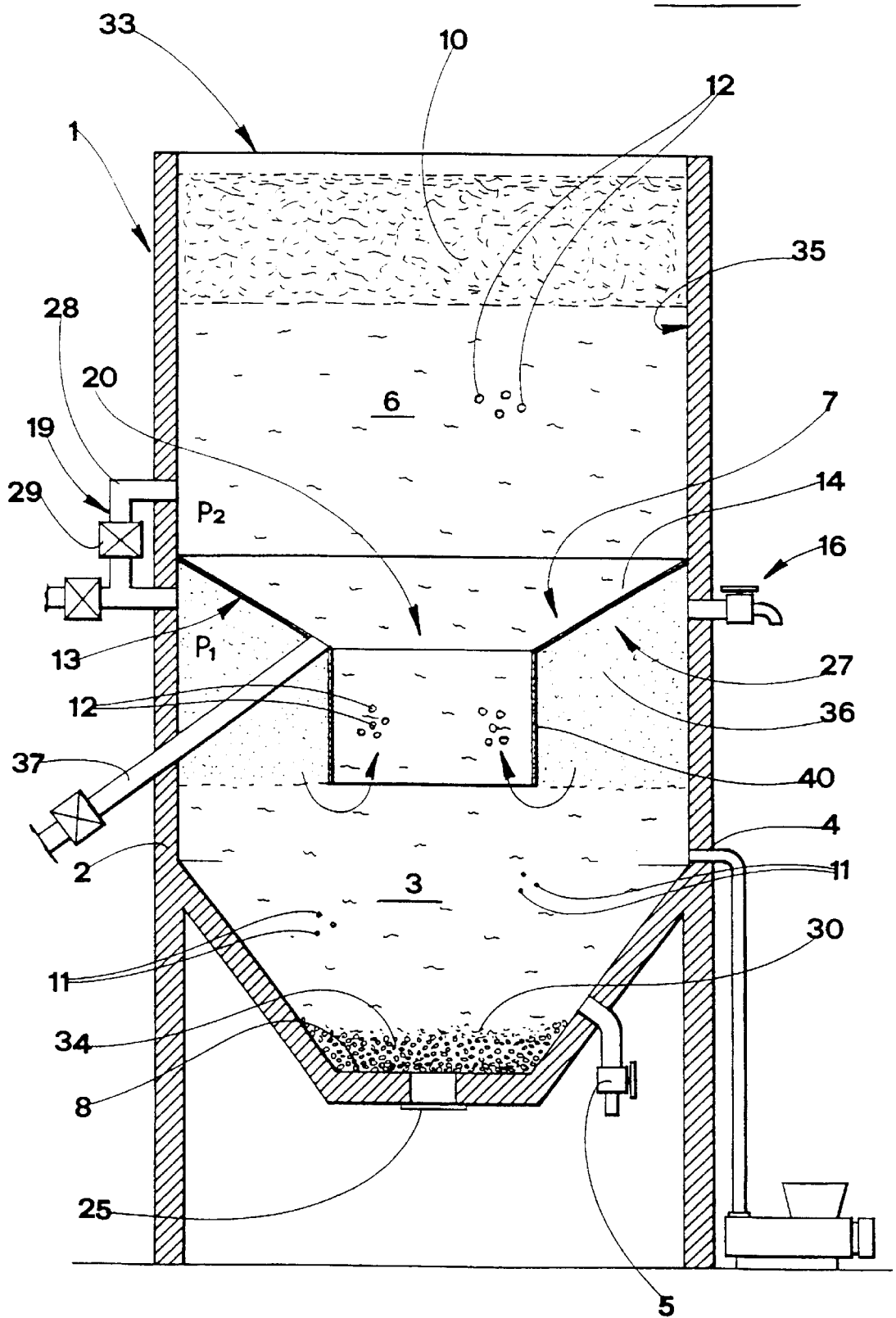
FIG. 7 shows a third constructional variant of the diaphragm.

FIG. 7 illustrates a further constructional variant which comprises an inverted frustoconical diaphragm, similar to the diaphragm of FIG. 1, which terminates at the bottom in a tube with a substantially vertical axis 40 thus forming a diaphragm in the form of a funnel which allows a considerable quantity of gas to be trapped. In this case also, it is possible to apply a discharge means which is preferably inclined downwards, for allowing the must 6 to flow out.

The solution illustrated therefore allows one to avoid or at least limit the formation of a solid cap and also allows one to remix continuously the cap with the fermenting winemust and extract the marc without the aid of pumps or the like. This latter feature is extremely important and worthy of note because it allows one to limit also the costs of providing the plants connected to the fermenter.

As a result of the present invention, it is therefore possible to provide fermenters which have a simple but effective design and which, in addition to being extremely economical when compared to fermenters of the known type, do not require complex or costly maintenance. The invention thus achieves the preset objects. Obviously the invention thus conceived may be subject to numerous modifications and variants, all falling within the scope of the inventive idea which characterizes it. In particular it is possible to use the fermenter according to the present invention, not only for the production of wine, but also for the transformation of other fermentable substances, such as, for example, apples or the like.

What is claimed is:

1. A fermenter comprising:
   a vat (2) suitable for containing a solution to be fermented (3);
   at least one opening (4, 33) for introducing the solution to be fermented (3);
   an opening (5, 25) for removing the fermented solution (6);
   at least one chamber (27) for accumulating fermentation gas (7), said chamber (27) arranged inside the vat between a bottom (8) of the vat (2) and a bottom surface of a frothy liquid portion (10) of the fermenting liquid formed on a non-frothy liquid portion, said chamber having a concavity directed downwards so as to intercept and accumulate temporarily small bubbles of gas (11) generated by fermentation and form and subsequently release, as a result of overflowing, as soon as the chamber (27) is full of gas, larger-sized bubbles (12) which rise toward the bottom surface of the frothy liquid portion (10).

2. Fermenter according to claim 1, characterized in that said chamber (27) is connected to the outside of the vat (2) by means of first controllable communication means (16), so as to be able to act from outside the vat (2) on the trapped gas, as required, causing the gas to flow in or flow out from outside the vat (2).

3. Fermenter according to claim 1, characterized in that accumulation device comprises at least one first concave surface (13), the concavity of which is directed downwards so as to trap the small bubbles (11), and at least one second concave surface (13') similar to the first one and arranged higher than it so that the larger-sized bubbles (12) produced by the first concave surface (13) rising up are at least partly intercepted by the said second concave surface (13').

4. Fermenter according to claim 1, characterized in that said concave surface (13) comprises second controllable connection means (19) suitable for connecting the chamber (27) to the part of the vat (2) located above this surface (13).

5. The fermenter according to claim 1 further comprising at least one first accumulating chamber having a concavity directed downwards so as to trap small bubbles (11) and at least one second accumulating chamber similar to said first accumulating chamber and arranged higher than said first accumulating chamber so that the larger-sized bubbles (12) produced by said first chamber when rising up are at least partially intercepted by said second chamber.

6. The fermenter according to claim 1 further comprising second controllable connection means (19) suitable for connecting the accumulating chamber (27) to the part of the vat (2) located above said accumulating chamber.

7. The fermenter according to claim 1 wherein said accumulating chamber (27) is connected to the outside of the vat (2) by means of first controllable communication means (16), so as to be able to act from outside the vat (2) on the trapped gas, as required, causing the gas to flow in or to flow out.

8. The fermenter according to claim 1 wherein said vat (2) comprises, in the region of said gas accumulating chamber, a discharge means (37) for allowing part of the fermented solution (6) to flow out together with the marc of the cap (10).

9. The fermenter according to claim 8 wherein the marc of the cap (10) flows out by means of gravity.

10. The fermenter according to claim 8 wherein the inlet of said discharge means (37) is arranged in the region of an aperture (20) of the gas accumulating chamber.

11. The fermenter according to claim 10 wherein said discharge means comprises a pipe (37).

12. The fermenter according to claim 8 wherein said discharge means comprises an opening located on the side walls of the vat at the height of the gas accumulating chamber.

13. Fermenter according to claim 8, characterized in that said discharge (37) comprises an opening located on the side walls of the vat at the height of the gas accumulation device (7).

14. The fermenter according to claim 1 wherein said accumulating chamber (27) is arranged inside the vat (2).

15. The fermenter according to claim 14 wherein said accumulating chamber comprises at least one concave surface (13).

16. The fermenter according to claim 15 wherein said concave surface (13) comprises an inclined surface (14) firmly fixed to the internal wall (15) of the vat (2).

17. The fermenter according to claim 15 wherein said concave surface (13) comprises a frustroconical surface firmly fixed to the internal wall (35) of the vat (2).

18. The fermenter according to claim 15 wherein said concave surface (13) comprises movable closing means designed to vary the size of an opening (20) of the vat (2) not occupied by the concave surface (13).

19. The fermenter according to claim 15 wherein said concave surface (13) comprises a frustroconical peripheral element (21), the vertex of which is directed upwards, delimited centrally by a cylindrical element (22), a controllable annular through-aperture (23) being provided between the two surfaces.

20. The fermenter according to claim 19 wherein said controllable annular aperture (23) comprises an inflatable toroid (24) for modifying the size of the aperture (23).

21. Fermenter according to claim 19, characterized in that said concave surface (13) converges centrally into a tube (40) which extends downwards.

22. The fermenter according to claim 15 wherein said concave surface (13) converges centrally into a tube (40) which extends downwards.

23. A fermenter comprising:

a vat (2) suitable for containing a solution to be fermented (3);

at least one opening (4, 33) for introducing the solution to be fermented (3);

an opening (5, 25) for removing the fermented solution (6);

at least one chamber (27) for accumulating fermentation gas (7), said chamber (27) arranged between a bottom (8) of the vat (2) and a bottom of a solid floating cap (10) formed at a top of the vat by a marc of the fermenting liquid, said chamber having a concavity directed downwards so as to intercept and accumulate temporarily small bubbles of gas (11) generated by fermentation and form and subsequently release, as a result of overflowing, as soon as the chamber (27) is full of gas, larger-sized bubbles (12) which rise toward the bottom surface of the frothy liquid portion (10).

* * * * *